United States Patent
Ke et al.

(10) Patent No.: US 8,869,090 B2
(45) Date of Patent: Oct. 21, 2014

(54) STRETCH DUMMY CELL INSERTION IN FINFET PROCESS

(71) Applicant: Taiwan Semiconductor Manufacturing Company, Ltd., Hsin-Chu (TW)

(72) Inventors: Li-Sheng Ke, Hsin-Chu (TW); Min-Yuan Tsai, Hsin-Chu (TW); Jia-Rong Hsu, Hsin-Chu (TW); Hung-Lung Lin, Hsin-Chu (TW); Wen-Ju Yang, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 13/833,958

(22) Filed: Mar. 15, 2013

(65) Prior Publication Data

US 2014/0258961 A1      Sep. 11, 2014

Related U.S. Application Data

(60) Provisional application No. 61/776,457, filed on Mar. 11, 2013.

(51) Int. Cl.
*G06F 17/50*      (2006.01)
*H01L 29/66*      (2006.01)

(52) U.S. Cl.
CPC ...... *G06F 17/5072* (2013.01); *H01L 29/66795* (2013.01)
USPC .......................................................... 716/122

(58) Field of Classification Search
CPC ................................... G06F 17/30; G06F 17/50
USPC .......................................................... 716/122
See application file for complete search history.

(56) References Cited

U.S. PATENT DOCUMENTS

| | | | |
|---|---|---|---|
| 2011/0108891 A1* | 5/2011 | Becker et al. ................. | 257/211 |
| 2011/0151359 A1* | 6/2011 | Shieh et al. ....................... | 430/5 |
| 2012/0278781 A1* | 11/2012 | Wann et al. ................... | 716/122 |

\* cited by examiner

*Primary Examiner* — Vuthe Siek
*Assistant Examiner* — Mohammed Alam
(74) *Attorney, Agent, or Firm* — Slater & Matsil, L.L.P.

(57) ABSTRACT

A method embodiment includes identifying an empty region in an integrated circuit (IC) layout, wherein the empty region is a region not including any active fins and outside a minimum spacing boundary, applying a grid map over the empty region, wherein the grid map comprises a plurality of grids inside the empty region, and filling the empty region with a plurality of dummy fin cells by placing a dummy fin cell in each of the plurality of grids, wherein applying the grid map and filling the empty region is performed using a computer.

20 Claims, 15 Drawing Sheets

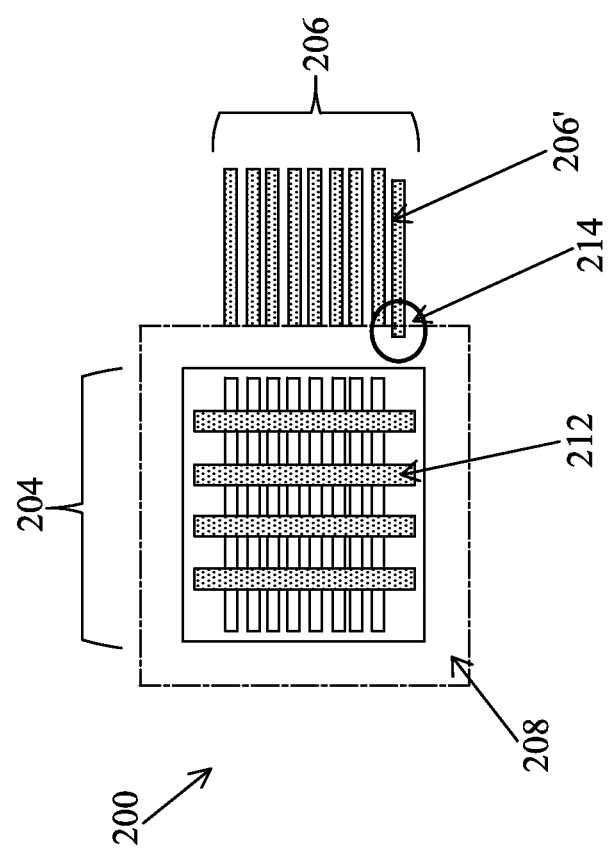

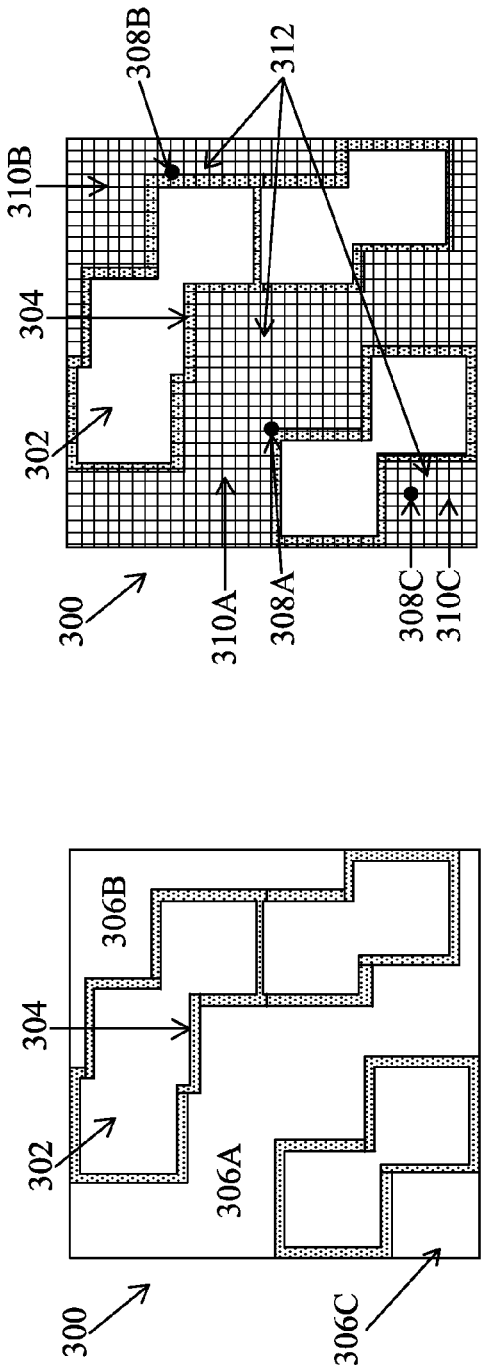
Fig. 2A
Fig. 2B
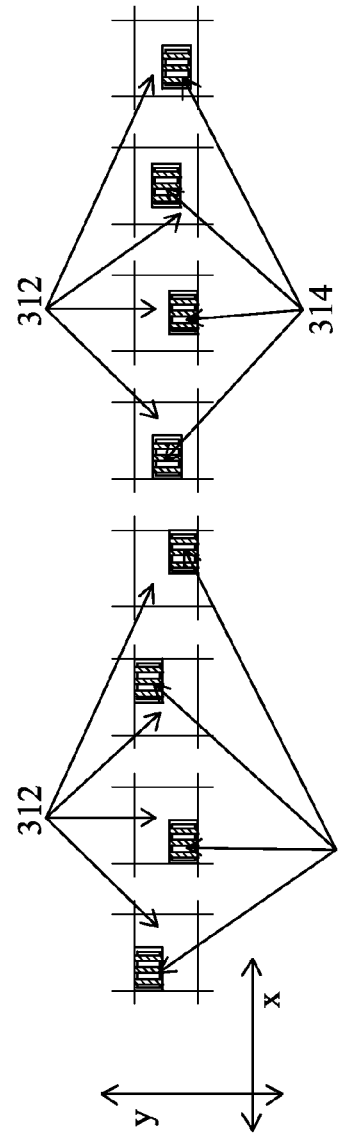
Fig. 2C

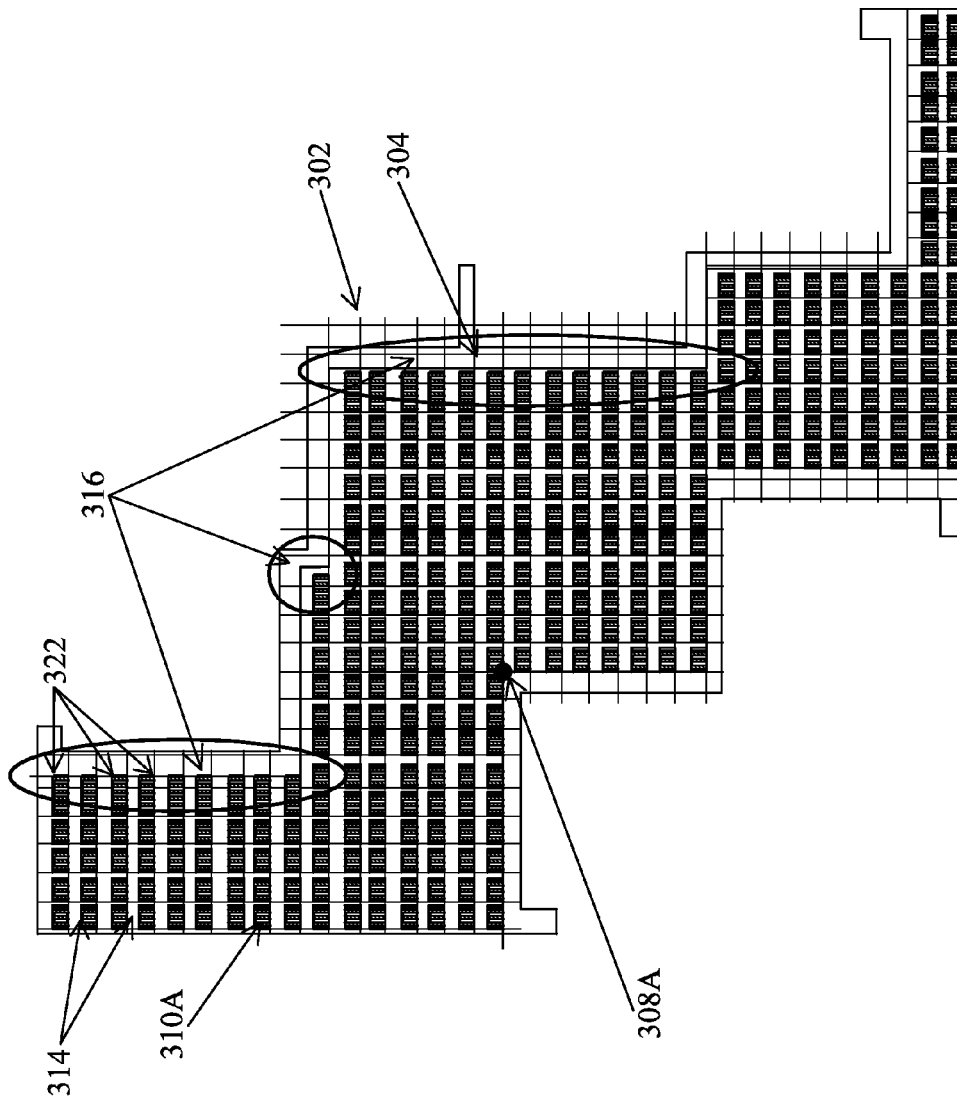

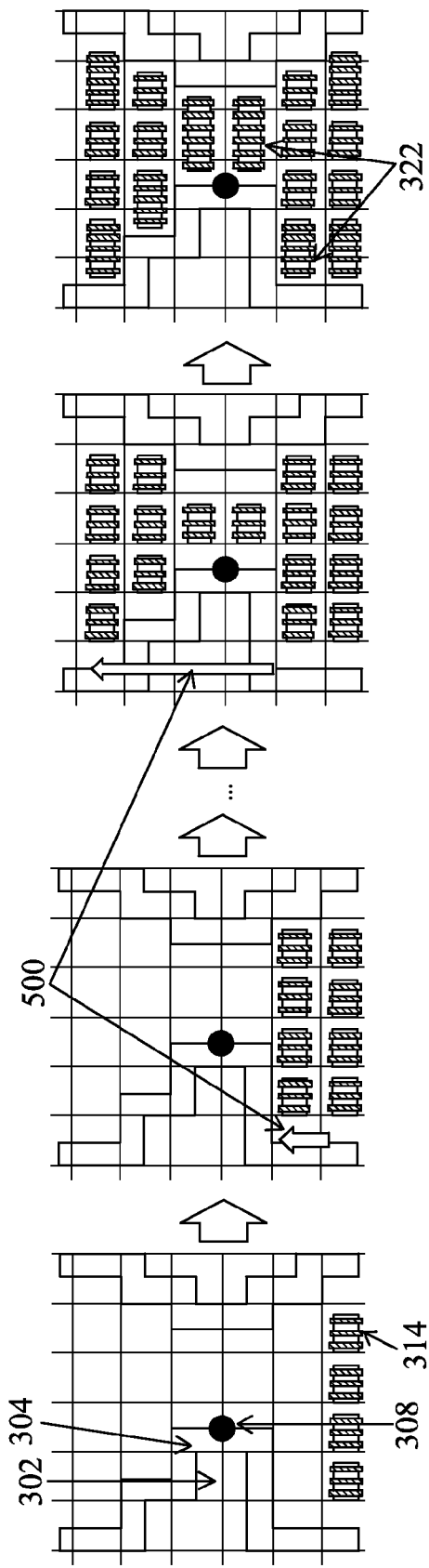
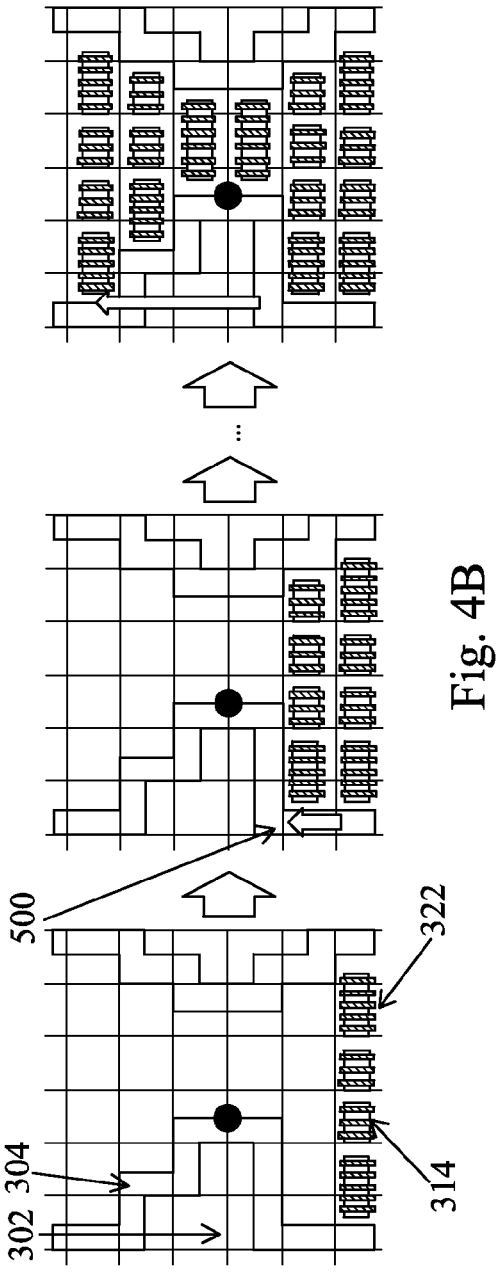
Fig. 4A
Fig. 4B

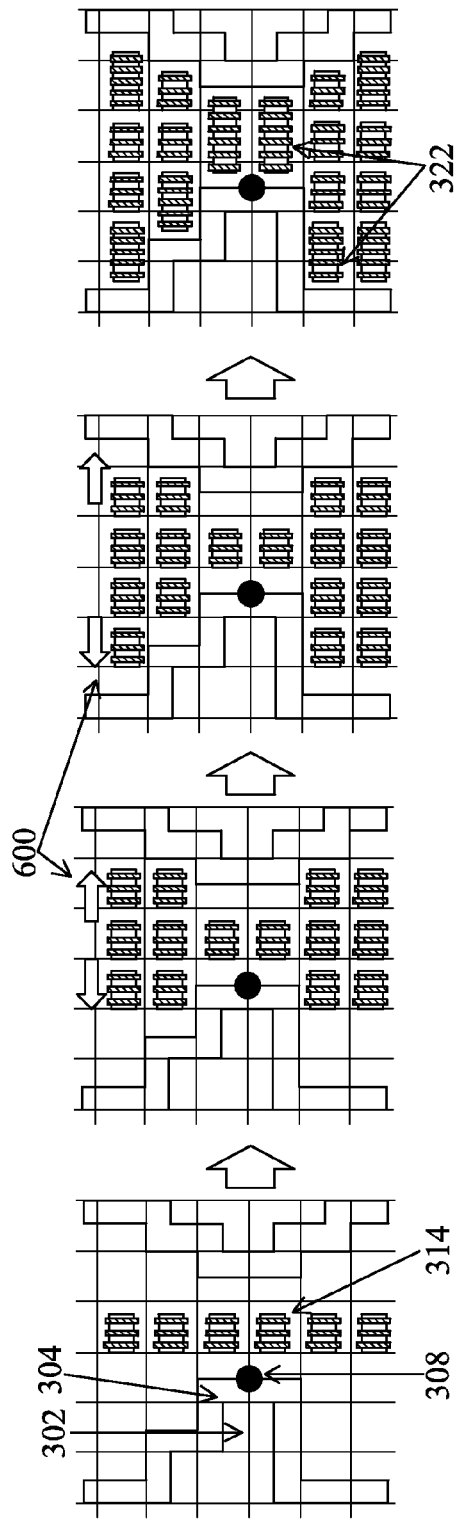
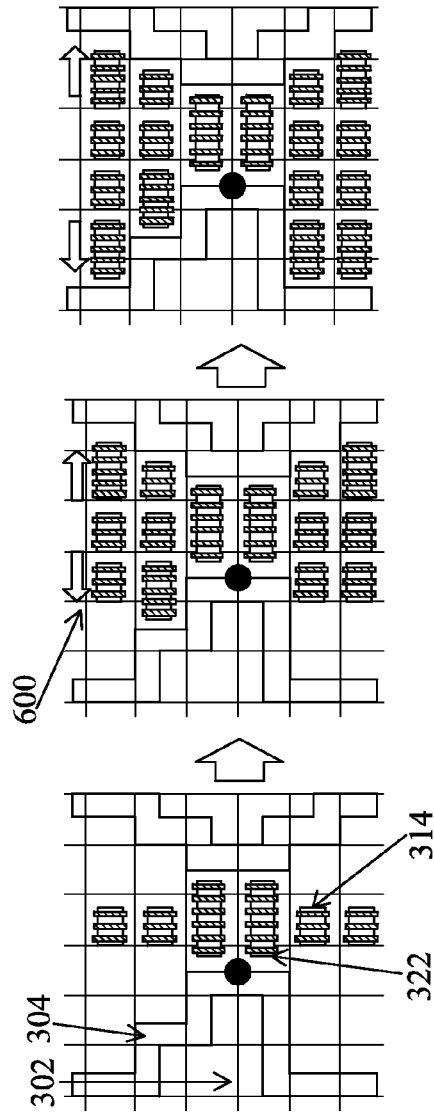
Fig. 5A
Fig. 5B

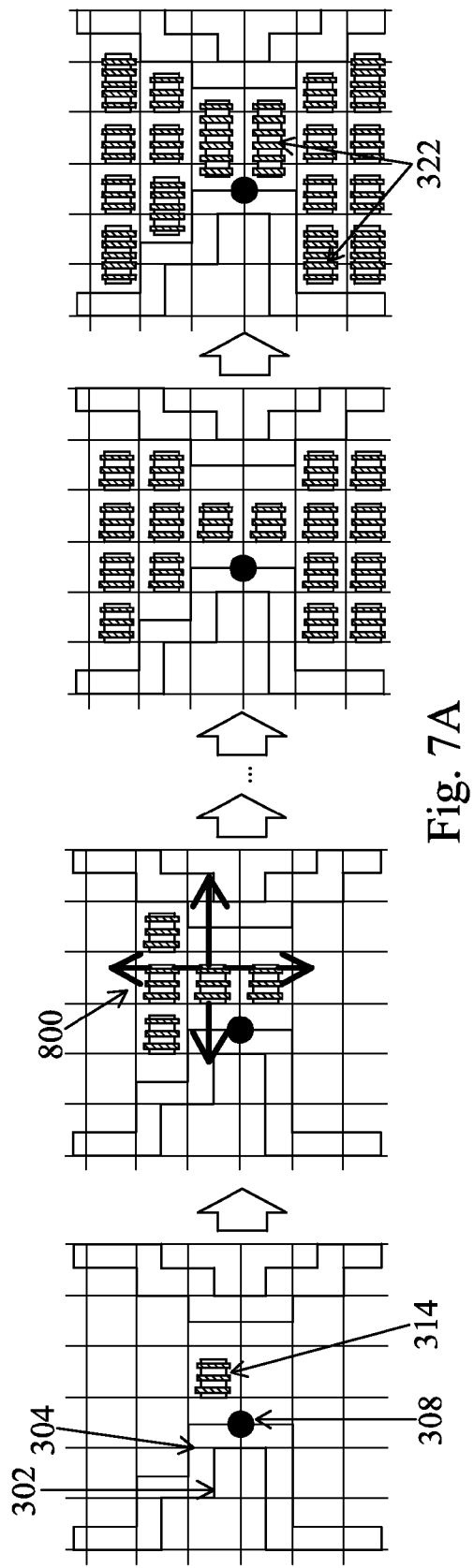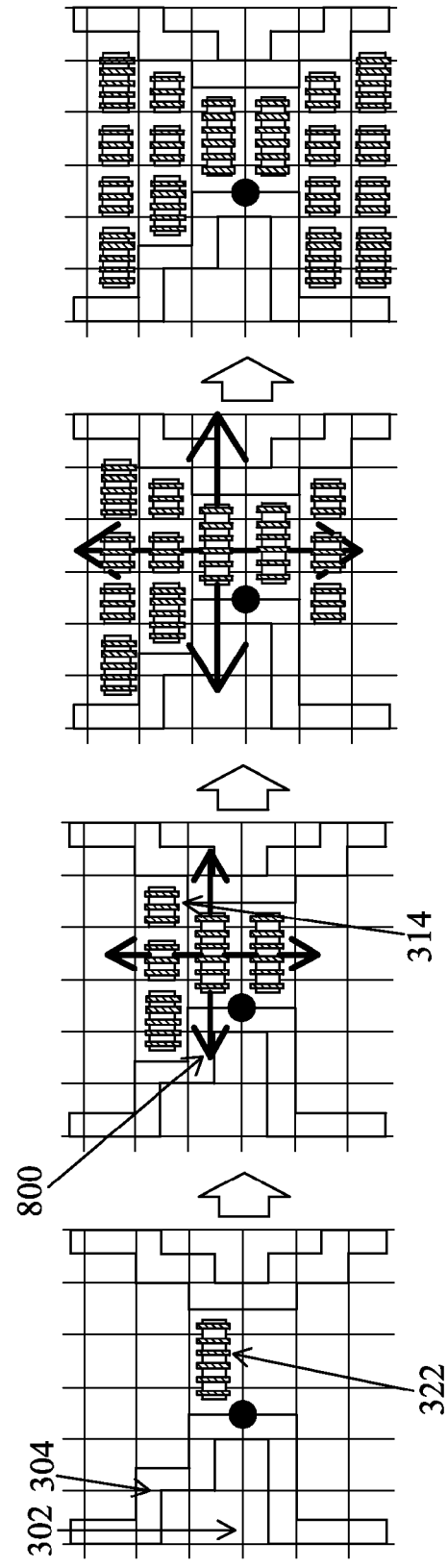

STRETCH DUMMY CELL INSERTION IN FINFET PROCESS

This application claims the benefit of U.S. Provisional Application Ser. No. 61/776,457, filed on Mar. 11, 2013, entitled "Stretch Dummy Cell Insertion in FinFET Process," which application is hereby incorporated herein by reference.

BACKGROUND

With the increasing down-scaling of integrated circuits (IC) and increasingly demanding requirements to the speed of ICs, transistors need to have higher drive currents with increasingly smaller dimensions. Fin field-effect transistors (FinFET) were thus developed. In a typical finFET, portions of a substrate are etched away to create a vertical fin structure. This vertical fin structure is used to form source/drain regions in the lateral direction, forming a channel region in the fin. A gate is formed over the fin in the vertical direction forming a finFET.

In a typical IC finFET layout, a fin array (i.e., a group of fins) may be situated next to an empty region. Empty regions refer to portions of an IC device layer without any fins or other active components. The presence of empty regions near a fin array may create problems in subsequent process steps and even lead to process failures. For example, after fins are formed, photolithography techniques may be used to form other features in the IC (e.g., a gate). When a photo resist layer is placed over a fin array and an empty region, the photo resist may have uneven topography.

An uneven photo resist layer creates issues with focus during the photolithography process and may cause process failures. These issues may be particularly detrimental on the boundaries of the fin array because it impedes the formation of other features over the fin array. Therefore, it is desirable to minimize the presence of empty regions in an IC near a fin array.

BRIEF DESCRIPTION OF THE DRAWINGS

For a more complete understanding of the present embodiments, and the advantages thereof, reference is now made to the following descriptions taken in conjunction with the accompanying drawings, in which:

FIGS. 1A-1C illustrate a portion of an integrated circuit (IC) including a finFET in accordance with various embodiments;

FIGS. 2A-2H illustrate various intermediate stages of forming a finFET layout in accordance with various embodiments;

FIGS. 3A-8B illustrate various alternative intermediate stages of forming a finFET layout in accordance with various embodiments.

DETAILED DESCRIPTION OF ILLUSTRATIVE EMBODIMENTS

The making and using of the present embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosed subject matter, and do not limit the scope of the different embodiments.

Embodiments will be described with respect to a specific context, namely a stretch dummy cell insertion process in finFETs. Other embodiments may also be applied, however, to other dummy cell insertion processes in non-finFET integrated circuits (ICs).

Figure 1A:
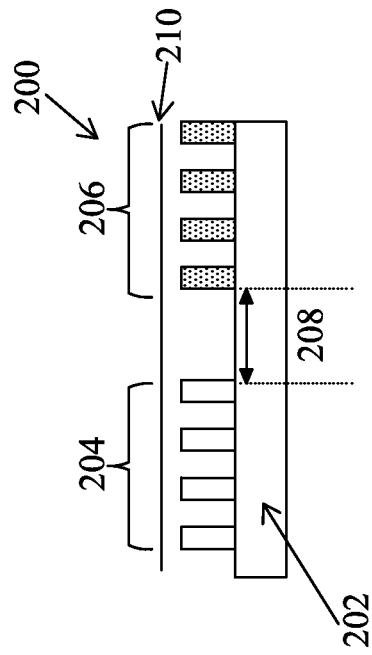
Figure 1B:
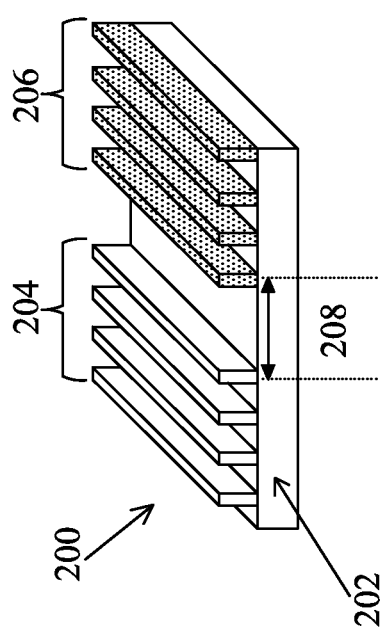

FIGS. 1A-1C illustrate a portion of an IC 200 in accordance with various embodiments. IC 200 includes a substrate 202, a fin array 204, and a plurality of dummy fins 206. Dummy fins 206 fill an otherwise empty region near fin array 204. As shown in FIG. 1B, the presence of dummy fins 206 allows for a top surface 210 of a photo resist layer to have an even topography. Dummy fins 206 are referred to as "dummy" because they are included for process purposes and are not included to form devices. For example, FIG. 1C shows as top-down view of IC 200 with fin array 204 including gates 212 in contrast to dummy fins 206, which do not include other features.

In order to ensure dummy fins 206 do not interfere with the operation of fin array 204, dummy fins 206 are separated from fin array 204 by a minimum spacing 208. The dimensions of minimum spacing 208 may vary from one IC to next depending on the properties of the particular devices in the IC. In designing the layout for IC 200, dummy fins 206 should not be placed within minimum spacing 208 (e.g., layouts including area 214 in FIG. 1C should be avoided).

Figure 2D:
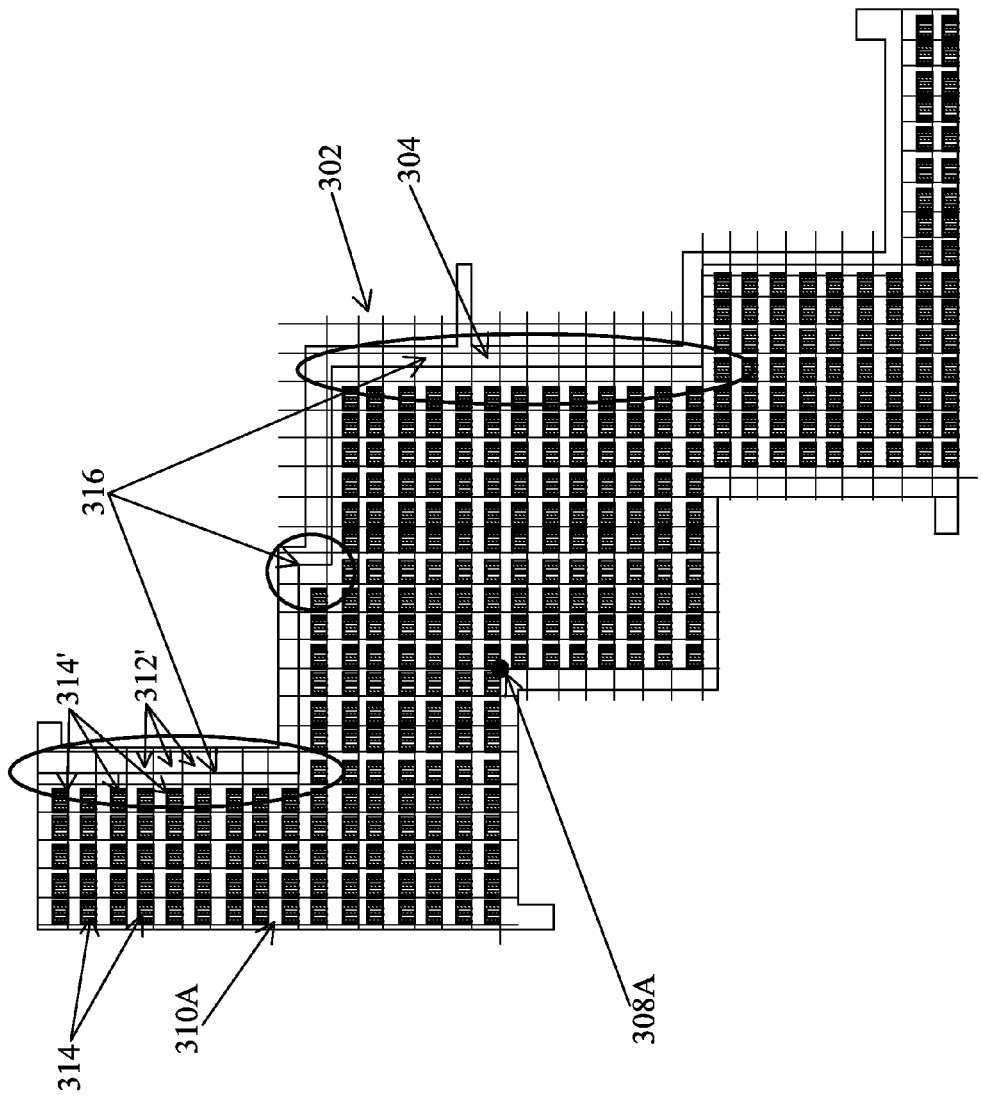

FIGS. 2A-2G illustrate top views of intermediate stages in laying out dummy fins in accordance with various embodiments. In FIG. 2A, a top-view of a portion of an IC layout 300 is shown. IC layout 300 includes active areas 302 containing fin arrays having a minimum spacing constraint as indicated by border 304. The dimensions and placements of active areas 302 and border 304 may vary from one IC layout to the next. Regions 306 (labeled regions 306A, 306B, and 306C) are identified as empty regions that may be minimized through the insertion of dummy fins. Dummy fins are inserted into regions 306 without crossing border 304.

In FIG. 2B, starting points 308A-308C are determined for regions 306A-306C respectively. The placement of starting points 308A-308C may be arbitrarily selected within each region. Starting points 308A-308C are selected so that grid maps 310A-310C may be laid out in regions 306A-306C respectively. Grid maps 310A-310C include a plurality of aligned and equally-sized grids 312 that facilitate the orderly placement of dummy fins within regions 306. Grid maps 310A-310C are laid out to cover regions 306A-306C completely and may extend over border 304 and active areas 302. Grid maps 310A-310C are aligned to starting points 308A-308C respectively. Because starting points 308A-308C may be arbitrarily placed, grid maps 310A-310C may or may not be aligned with each other.

FIG. 2C illustrates various alternative configurations for placing dummy fin cells 314 in grids 312. Each dummy fin cell 314 represents a dummy fin structure and is defined to be a minimum unit of dummy fin insertion in the layout process. Each grid 312 may include one dummy fin cell 314. Dummy fin cells 314 may be placed at any location within grids 312. For example, various possible placements of dummy fin cells 314 in grids 312 are shown in FIG. 2C. However, within a grid map (e.g., grid map 310A), the placement of dummy fin cells 314 in grids 312 is constant. That is, within a grid map, dummy fin cells 314 are placed in the same relative location of grids 312 respectively. By keeping the placement of dummy fin cells 314 constant within a grid map, the orderly placement of various features may be maintained.

Furthermore, FIG. 2C shows grids 312 being larger than dummy fin cells 314. The sizing of grids 312 is configurable and may be related to the size of dummy fin cells 314. For example, the size of grids 312 may be selected to maintain a desired pitch in the x and/or y-direction. Pitch refers to the distance between an edge of a dummy fin cell and a corresponding edge of an adjacent dummy fin cell. For example, pitch could be the distance between the left-most edge of a dummy fin cell and the left-most edge of an adjacent dummy fin cell. Therefore, grids 312 may be sized to ensure a desired, uniform spacing between dummy fin cells 314 in both the x and y direction.

FIG. 2D illustrates filling region 306A, having grid map 310A, with dummy fin cells 314. A dummy fin cell 314 is placed in as many grids 312 as possible without violating the minimum spacing constraint. However, boundary grids 312' (e.g., grids 312 in highlighted regions 316) extend over border 304. Placing dummy fin cells in these boundary grids 312' will violate the minimum spacing constraint. Therefore boundary grids 312' may not be filled with dummy fin cells 314. Alternatively, all grids 312 (including boundary grids 312') may be first filled with dummy fin cells 314. Subsequently, dummy fin cells 314 that violate the minimum spacing constraint may be removed.

Figure 2E:
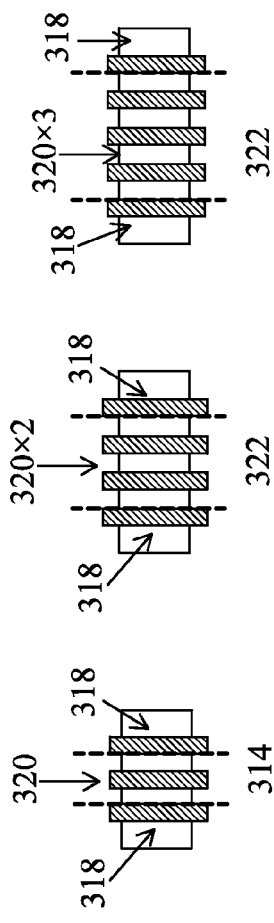

In order to further minimize empty space in region 306, dummy fin cells 314' (i.e., the dummy fin cells adjacent to boundary grids 312') may be extended. FIG. 2E illustrates the expansion of dummy fin cells 314' in accordance with various embodiments. Dummy fin cell 314 includes edge portions 318 and middle portion 320. In expanded dummy fin cell 322, edge portions 318 remain constant. However, middle portion 320 may be multiplied to create expanded dummy fin cell 322 (e.g., FIG. 2E shows middle portion 320 being doubled and tripled). An advantage to this approach is that the size of expanded dummy fin cell 322 is derived from and related to the size of dummy fin cell 314. Therefore, the file size of an IC layout file (e.g., a GDS file) corresponding to IC layout 300 may be comparatively small. In contrast, if the size of expanded dummy fin cell 322 is unrelated to dummy fin cell 314, the file size of the IC layout file corresponding to IC layout 300 may be larger.

Figure 2F:
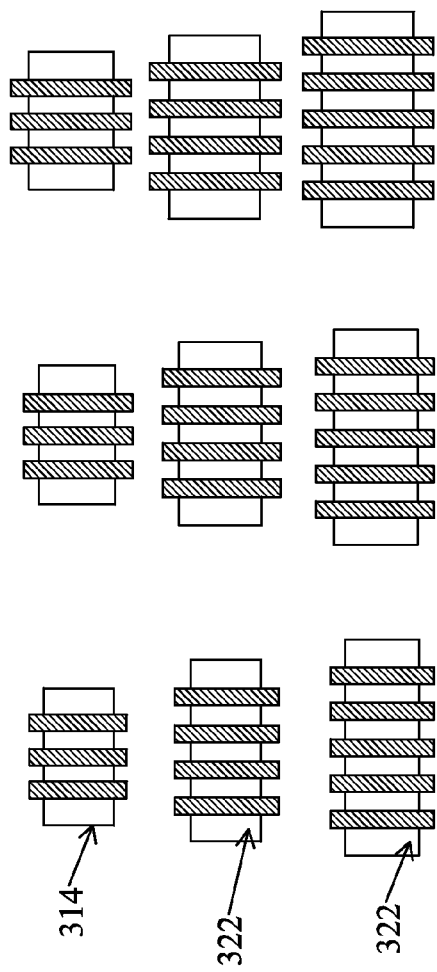

Additionally, as illustrated by FIG. 2F, dummy fin cells may be expanded in the vertical direction. Like horizontal expansion, vertical expansion may also be may be achieved by multiplying the height of dummy fin cell 314 (or a horizontally expanded dummy fin cell 322) by a constant. Therefore, a vertically expanded dummy fin cell may also be a multiple of a dummy fin cell 314, and the IC layout file size may be reduced.

FIG. 2G illustrates the replacement of dummy fin cells 314' bordering boundary grids 312' with expanded dummy fin cells 322. Expanded dummy fin cells 322 have the same placement as dummy fin cells 314 in grids 312; however, expanded dummy fin cells extend into boundary grids 312'. Therefore, an expanded dummy fin cell may occupy multiple grids. Empty space in regions 306A is thus minimized. Regions 306B and 306C may be filled in a similar manner as region 306A.

Figure 2H:
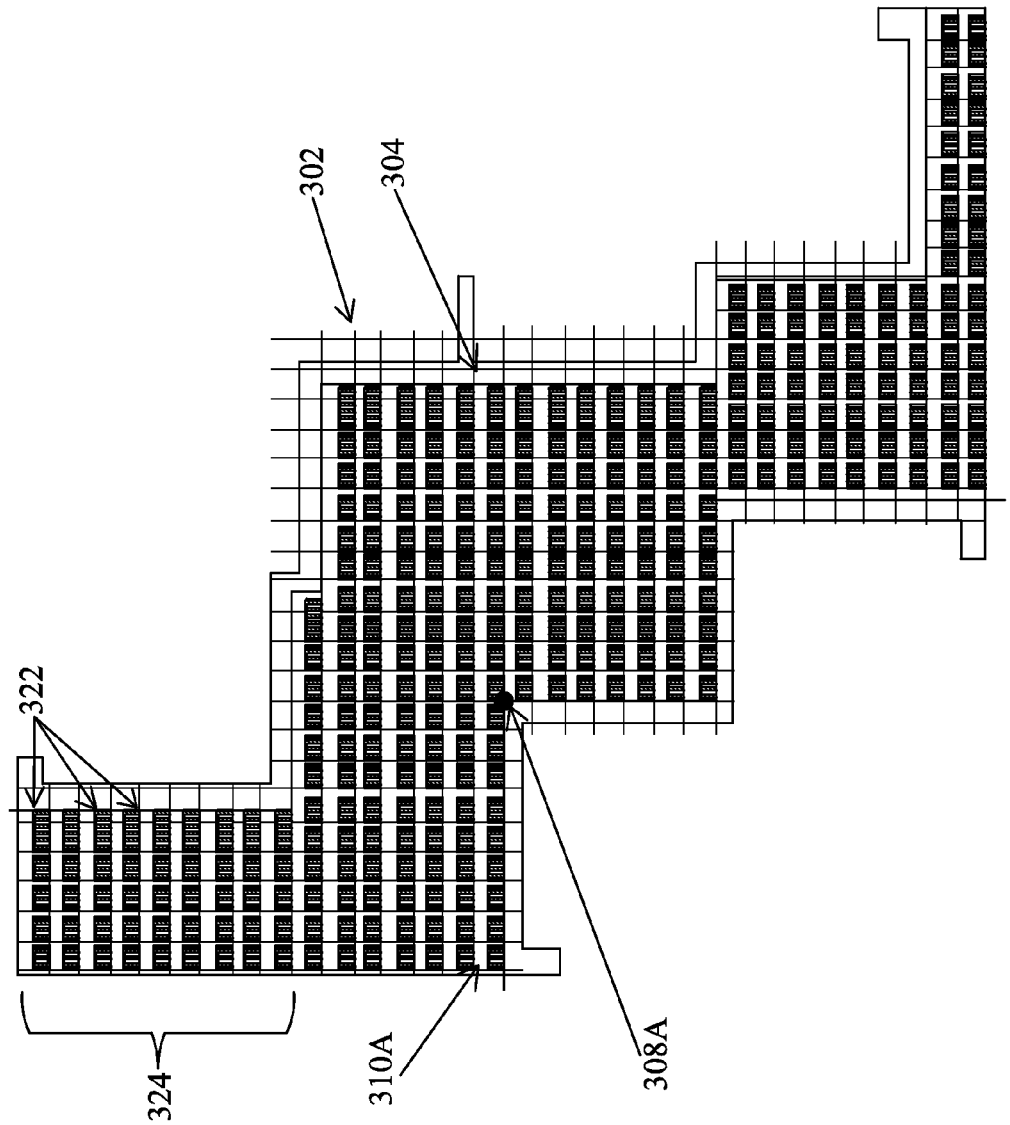

FIG. 2H illustrates an alternative embodiment wherein one expanded dummy fin cell 322 occupies an entire roll in region 324. All the dummy fin cells 314 in a same row of region 324 have been replaced with one expanded dummy fin cell 322. Therefore, horizontal spacing (i.e., the pitch in the x-direction) between dummy fin cells 314 is eliminated. The layout in FIG. 2H may be used to increase the density of dummy cells in a region, for example, to meet design rule density limitations. This approach may also be used in non-finFET layout processes to meet design rule density limitations for other dummy features.

Figure 3A:
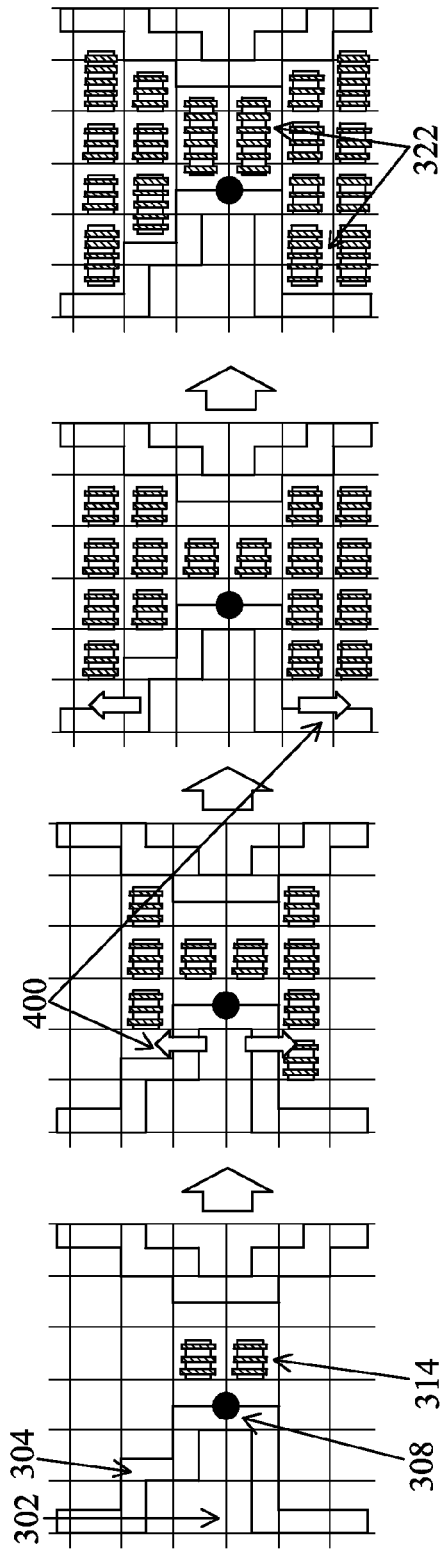
Figure 3B:
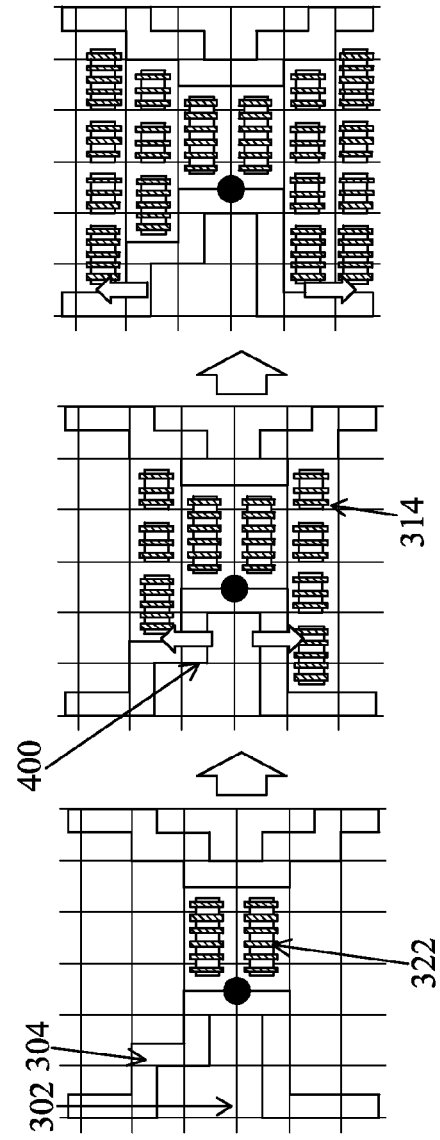

The placement and expansion of dummy fin cells 314 into regions 306 may be done in any order. FIGS. 3A-8B illustrate various alternative methods of placing and expanding dummy fin cells 314. For example, in FIG. 3A, dummy fin cells 314 are first placed row by row from starting point 308. Alternatively, dummy fin cells 314 may be placed row starting from any other location. The rows above and beneath starting point 308 are then filled in bi-directionally as indicated by arrows 400. After all the dummy fin cells 314 are placed into grids, certain dummy fin cells (i.e., those near border 304) may be replaced with expanded dummy fin cells 322 to further minimize empty space. Alternatively, as shown by FIG. 3B, appropriate dummy fin cells may be placed into a row and replaced with expanded dummy fin cells 322 before the next row of grids is filled.

FIGS. 4A-4B shows an alternative method wherein dummy fin cells 314 are still placed row by row. However, rows of grids are filled uni-directionally as indicated by arrow 500. FIG. 4A shows region 306 being completely filled with dummy fin cells 314 before they are expanded. FIG. 4B illustrates certain dummy fin cells 314 in a row being expanded before a next row is filled.

FIGS. 5A-5B illustrate yet another alternative wherein dummy fin cells 314 are placed column by column. Columns in region 306 are subsequently filled bi-directionally as indicated by arrows 600. Dummy fin cells 314 may first fill a region completely before they are expanded (as shown by FIG. 5A), or appropriate dummy fin cells 314 in a column may be expanded before a next column is filled (as shown by FIG. 5B).

Figure 6A:
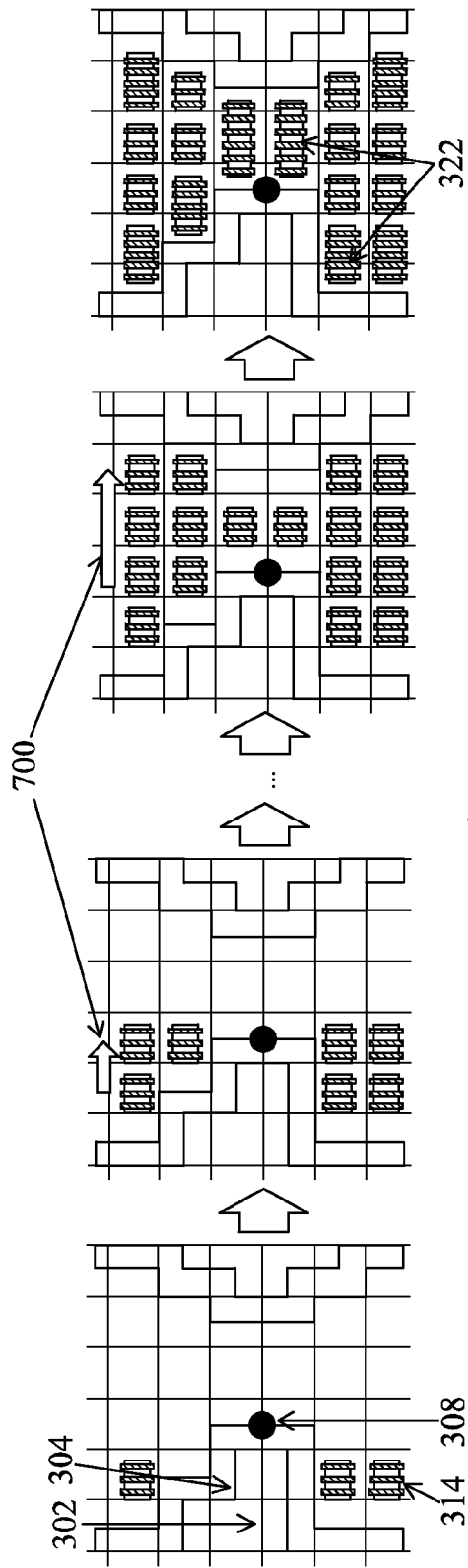
Figure 6B:
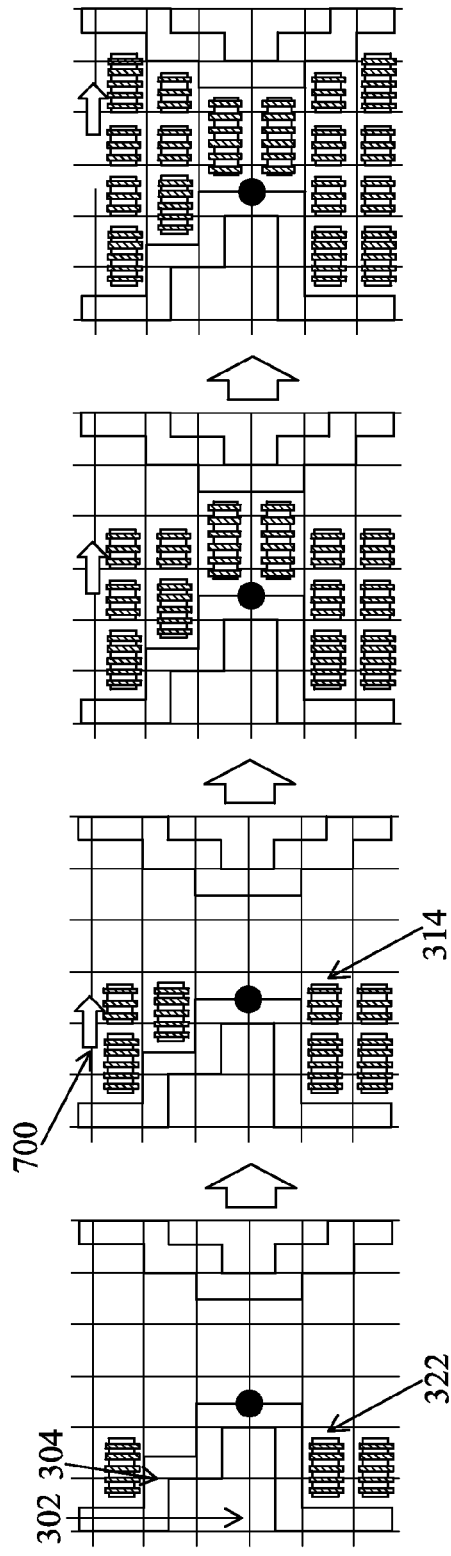

FIGS. 6A and 6B illustrate the filling of region 306 with dummy fin cells 314 column by column. However, columns are filled uni-directionally from left to right as indicated by arrow 700. Alternatively, columns may also be filled in a right to left direction. Again, expansion of appropriate dummy fin cells 314 may be done after all grids are filled (FIG. 6A) or after each column is filled (FIG. 6B).

FIGS. 7A and 7B illustrate filling grids in region 306 in both the vertical and horizontal directions as indicated by arrows 800 (i.e., multi-directionally). FIG. 7A shows expansion of dummy fin cells 314 after all grids are filled. FIG. 7B shows expansion of dummy fin cells 314 after each group of grids is filled.

Figure 8A:
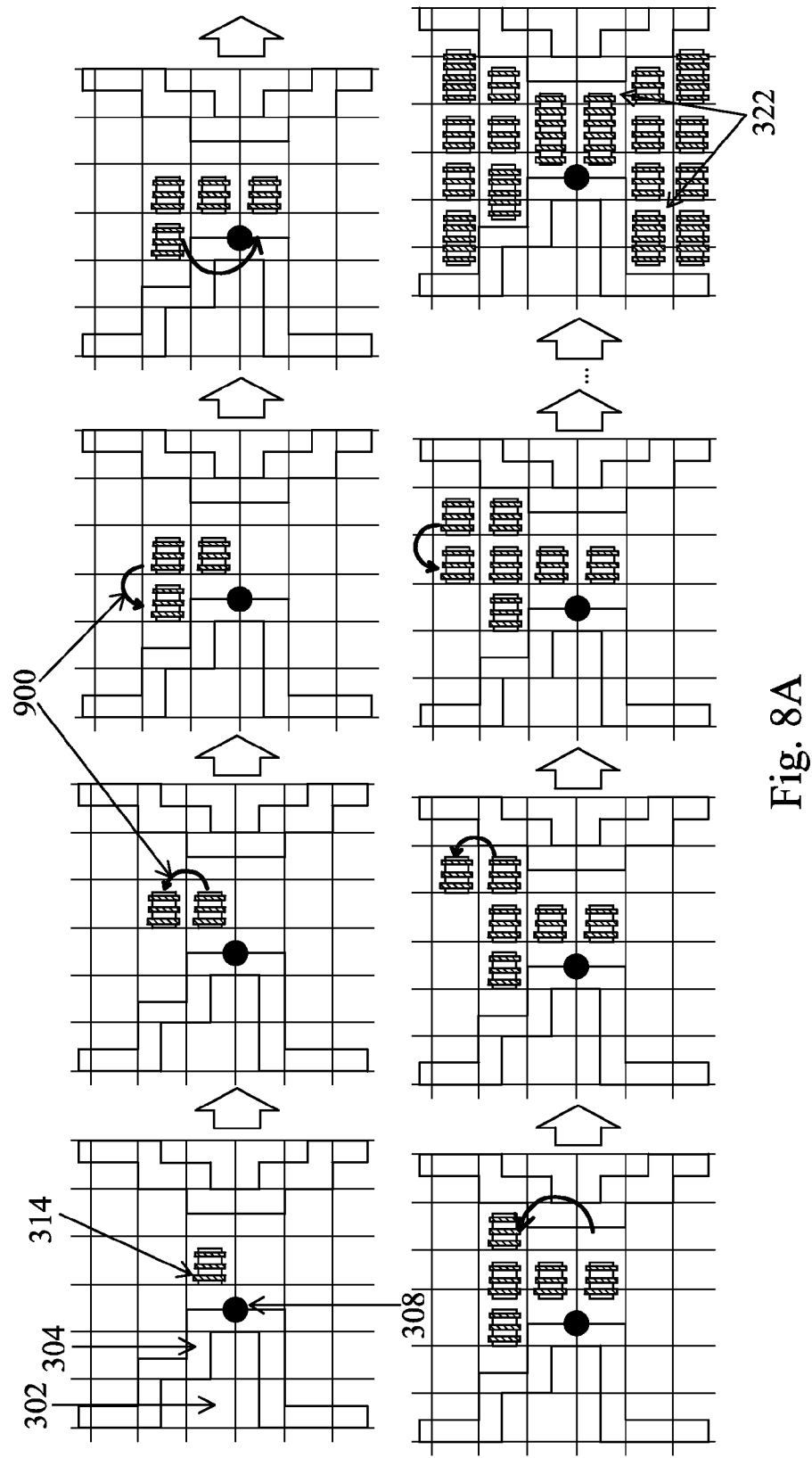
Figure 8B:
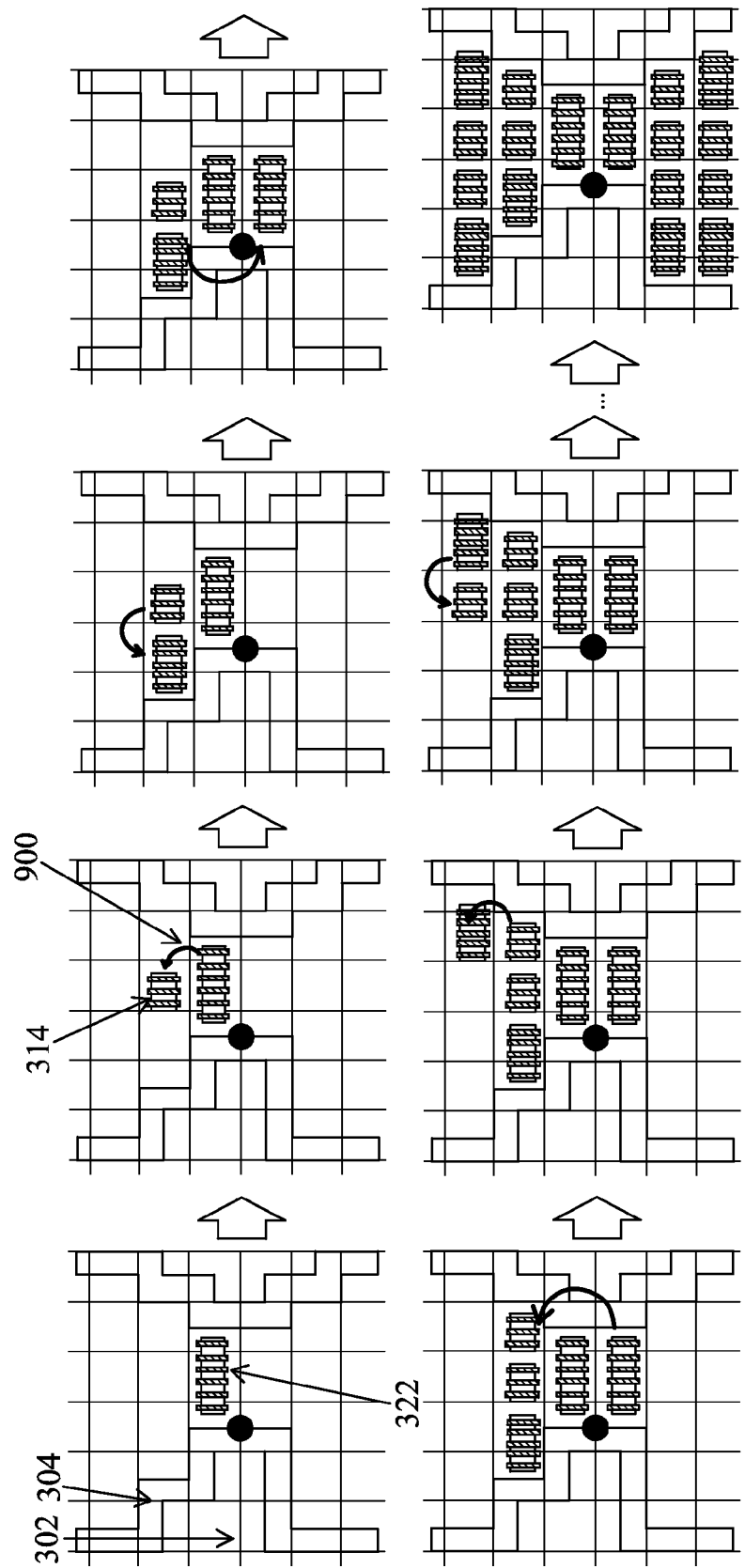

FIGS. 8A and 8B illustrate filling grids in region 306 in a counter-clockwise spiral direction indicated by arrow 900. Alternatively, region 306 may also be filled in a clockwise spiral direction. Expansion of dummy fin cells 314 may be performed after the entire map is filled (FIG. 8A) or after each grid is filled (FIG. 8B). As shown by the various examples in FIGS. 3A-8B, the filling of grids and expansion of dummy fin cells in a region are not limited to any particular order of steps.

Figure 9:
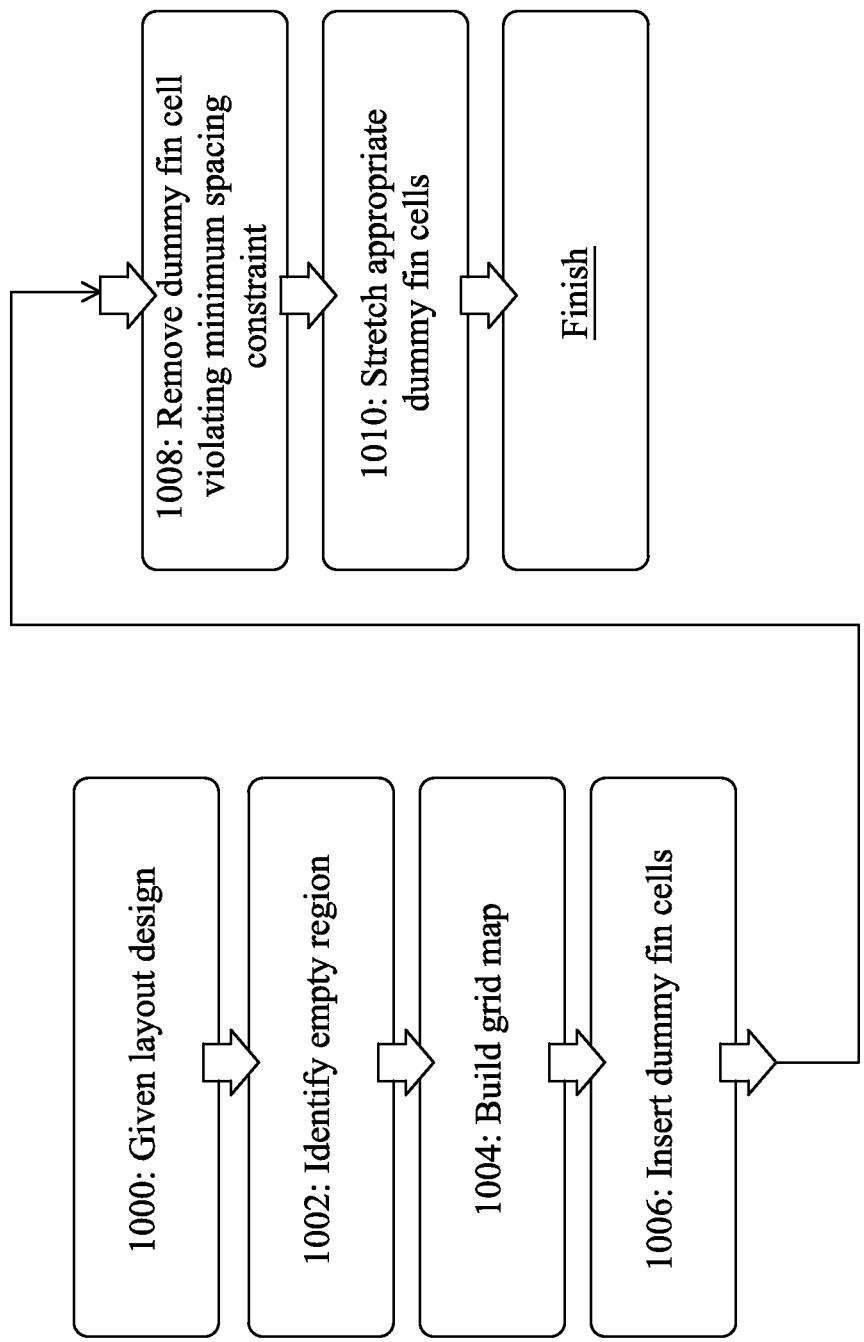
FIG. 9 is a flow diagram illustrating the steps of forming a finFET layout in accordance with various embodiments.

FIG. 9 is a flowchart illustrating steps of laying out dummy fin cells in an IC according to various embodiments. In step 1000, a design layout is given. The design layout may include active fin arrays and a minimum spacing constraint. The minimum spacing constraint is included so that dummy fins are spaced an appropriate distance away from active fin arrays so as to not interfere with IC functionality.

In step 1002, empty regions are identified. Empty regions are any regions outside the minimum spacing constraint that do not include any active fin arrays. These empty regions, if left unfilled, may cause problems in subsequent process steps. For example, empty regions near a fin array may lead to process failures in a photolithographic process.

In step 1004, grid maps are laid out over the empty regions. The grid maps include equally-sized, aligned grids. The grid maps amongst several regions may or may not be aligned with each other. The size of a grid may be related to the size of a dummy fin cell, and the size of a grid may be selected to maintain a desired pitch (i.e., spacing in either the lateral or vertical direction) between dummy cells. Furthermore, the grid map may fill an entire empty region and expand past the minimum spacing constraint.

In step 1006, each grid in an empty region is filled with a dummy fin cell. The filling of grids with dummy fin cells may be done in any order (e.g., any of the placement orders illustrated in FIGS. 3A-8B). Grids that cross into the minimum spacing constraint may be left empty. Alternatively, the grids that cross into the minimum spacing constraint may be filled as well. In step 1008, any dummy fin cells that violate the minimum spacing restraint are removed.

Finally in step 1010, certain dummy fin cells may be stretched to further minimize any remaining gaps in the empty region. These remaining gaps may include grids that cross into the minimum spacing constraint. Alternatively, the remaining gaps may include spacing between dummy fin cells that should be eliminated to meet a design rule dummy fin cell density requirement. Dummy fin cells adjacent to these remaining empty regions may be stretched. Alternatively, dummy fin cells are stretched at various points while the grid map is being filled.

In accordance with an embodiment, a method includes identifying an empty region in an IC layout, wherein the empty region is a region not including any active fins and outside a minimum spacing boundary. The method further includes applying a grid map over the empty region, wherein the grid map comprises a plurality of grids inside the empty region. The empty region is filled with a plurality of dummy fin cells by placing a dummy fin cell in each of the plurality of grids. The steps of applying the grid map and filling the empty region are performed using a computer.

In accordance with another embodiment, a method for designing an IC layout includes identifying an empty region in an IC layout. The IC layout comprises an active fin region, and the empty region is separated from the active fin region by a minimum spacing constraint region. A starting point is selected in the active region, and a grid map is laid over the empty region and the minimum spacing constraint region. The grid map includes a plurality of empty region grids fully inside the empty region and a plurality of boundary grids having at least a portion over the minimum spacing constraint region. Furthermore, the plurality of empty region grids and the plurality of boundary grids have a same size and are aligned with the starting point. The empty region is filled with a plurality of dummy fin cells by placing a standard dummy fin cell in each of the plurality of empty region grids, and replacing each standard dummy fin cell in each of the plurality of empty region grids adjacent to the plurality of boundary grids with an expanded dummy fin cell. The expanded dummy fin cell does not extend into the minimum spacing constraint region, and the expanded dummy fin cell includes a first portion in an empty region grid and a second portion in a boundary grid.

In accordance with yet another embodiment, a method includes identifying a first and a second empty region in a IC layout. The IC layout includes an active region having fin arrays, and the first and the second empty regions are separated from each other by the active region. A first and a second grid map are applied over the first and the second empty regions respectively. The first and the second grid maps include a first and a second plurality of grids respectively. The first and the second empty regions are filled with a plurality of dummy fin cells by placing a dummy fin cell in each of the first and second plurality of grids. The fin arrays and the plurality of dummy fin cells are implemented in an IC.

Although the present embodiments and their advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
identifying an empty region in an integrated circuit (IC) layout, wherein the empty region is a region not including any active fins and outside a minimum spacing boundary;
applying a grid map over the empty region, wherein the grid map comprises a plurality of grids inside the empty region;
filling the empty region with a plurality of dummy fin cells by placing a dummy fin cell in each of the plurality of grids, wherein applying the grid map and filling the empty region is performed using a computer; and
implementing the plurality of dummy fin cells in an IC.

2. The method of claim 1, wherein each of the plurality of grids is of an equal size and aligned with a point in the empty region.

3. The method of claim 2, wherein the size of each of the plurality of grids is configured in accordance with a size of the dummy fin cell and a desired pitch.

4. The method of claim 1, wherein placing a dummy fin cell in each of the plurality of grids further comprises placing a dummy fin cell in a same relative position in each of the plurality of grids.

5. The method of claim 1, further comprising, after filling the empty region:
identifying a gap in the empty region, wherein the grid map overlays the gap; and
replacing the dummy fin cell in a grid adjacent to the gap with an expanded dummy fin cell, wherein the expanded dummy fin cell is outside the minimum spacing boundary, and wherein the expanded dummy fin cell comprises a first portion in the grid adjacent the gap and a second portion filling the gap.

6. The method of claim 5, wherein the dummy fin cell comprises two edge portions and a standard center portion, and wherein the expanded dummy fin cell comprises the two edge portions and an expanded center portion, the expanded center portion being a multiple of the standard center portion.

7. A method for designing and forming an integrated circuit (IC) comprising:
designing an IC layout, wherein designing the IC comprises:
identifying, by a processor, an empty region in the IC layout, wherein the IC layout comprises an active fin region, and wherein the empty region is separated from the active fin region by a minimum spacing constraint region;

selecting a starting point in the empty region;

laying, by the processor, a grid map over the empty region and the minimum spacing constraint region, wherein the grid map comprises a plurality of empty region grids fully inside the empty region and a plurality of boundary grids having at least a portion over the minimum spacing constraint region, the plurality of empty region grids and the plurality of boundary grids having a same size and aligned with the starting point; and filling, by the processor, the empty region with a plurality of dummy fin cells by:
placing a standard dummy fin cell in each of the plurality of empty region grids; and
replacing the standard dummy fin cell in each of the plurality of empty region grids adjacent to the plurality of boundary grids with an expanded dummy fin cell, wherein the expanded dummy fin cell does not extend into the minimum spacing constraint region, and wherein the expanded dummy fin cell comprises a first portion in an empty region grid and a second portion in a boundary grid; and implementing the IC layout in an IC.

8. The method of claim 7, wherein filling the empty region comprises placing a standard dummy fin cell in each of the plurality of empty region grids, in the grid map, row by row.

9. The method of claim 7, wherein filling the empty region comprises placing a standard dummy fin cell in each of the plurality of empty region grids, in the grid map, column by column.

10. The method of claim 7, wherein filling the empty region comprises placing a standard dummy fin cell in each of the plurality of empty region grids, in the grid map, uni-directionally.

11. The method of claim 7, wherein filling the empty region comprises placing a standard dummy fin cell in each of the plurality of empty region grids, in the grid map, bi-directionally.

12. The method of claim 7, wherein filling the empty region comprises placing a standard dummy fin cell in each of the plurality of empty region grids, in the grid map, multi-directionally.

13. The method of claim 7, wherein filling the empty region comprises placing a standard dummy fin cell in each of the plurality of empty region grids in the grid map in a spiral direction.

14. The method of claim 7, wherein filling the empty region comprises placing a standard dummy fin cell in each of the plurality of empty region grids before replacing the standard dummy fin cell in each of the plurality of empty region grids adjacent to the plurality of boundary grids with an expanded dummy fin cell.

15. The method of claim 7, wherein filling the empty region comprises replacing the standard dummy fin cell in each of a first portion of the plurality of empty region grids adjacent to the plurality of boundary grids with an expanded dummy fin cell before placing a standard dummy fin cell in each of a second portion of the plurality of empty region grids.

16. A method comprising:
identifying, by a processor, a first and a second empty region in an IC layout, wherein the IC layout comprises an active region comprising a fin array, and wherein the first and the second empty regions are separated from each other by the active region;

applying a first and a second grid map over the first and the second empty regions respectively, wherein the first and the second grid maps comprise a first and a second plurality of grids respectively;

filling the first and the second empty regions with a plurality of dummy fin cells by placing a dummy fin cell in each of the first and second plurality of grids; and implementing the fin array and the plurality of dummy fin cells in an IC.

17. The method of claim 16, wherein the first and second empty regions are separated from the active region by a minimum spacing.

18. The method of claim 16, wherein the first and the second grid maps are aligned with a same point in the first or the second empty region.

19. The method of claim 16, wherein the first and the second grid maps are aligned with a first and a second point in the first and second empty regions respectively, and wherein the first and the second grid maps are not aligned with each other.

20. The method of claim 16, further comprising, after filling the first and second empty regions:
identifying gaps in the first and the second empty regions, wherein the first and the second grid maps overlay the gaps; and
replacing the dummy fin cells in grids adjacent to the gaps with expanded dummy fin cells, wherein the expanded dummy fin cells each comprise a first portion in a grid adjacent to a gap and a second portion filling the gap.

* * * * *